(12) United States Patent
Tynkkynen et al.

(10) Patent No.: US 11,338,424 B2
(45) Date of Patent: May 24, 2022

(54) INSERT BUSHING ARRANGEMENT, BREAKING HAMMER AND RELATED METHOD

(71) Applicant: SANDVIK MINING AND CONSTRUCTION OY, Tampere (FI)

(72) Inventors: Esa Tynkkynen, Lahti (FI); Ossi Niemioja, Lahti (FI); Marko Tourunen, Lahti (FI)

(73) Assignee: Sandvik Mining and Construction Oy, Tampere (FI)

( * ) Notice: Subject to any disclaimer, the term of this patent is extended or adjusted under 35 U.S.C. 154(b) by 183 days.

(21) Appl. No.: 16/717,510

(22) Filed: Dec. 17, 2019

(65) Prior Publication Data

US 2020/0198111 A1 Jun. 25, 2020

(30) Foreign Application Priority Data

Dec. 21, 2018 (EP) .................................... 18215498

(51) Int. Cl.
   *B25D 17/06* (2006.01)

(52) U.S. Cl.
   CPC ........ *B25D 17/06* (2013.01); *B25D 2250/231* (2013.01); *B25D 2250/335* (2013.01)

(58) Field of Classification Search
   CPC .............. B25D 17/06; B25D 2250/231; B25D 2250/335
   USPC ......................................................... 173/210
   See application file for complete search history.

(56) References Cited

U.S. PATENT DOCUMENTS

| 1,744,141 | A | * | 1/1930 | Pryce | ..................... | B25D 17/06 |
| | | | | | | 173/78 |
| 2,999,407 | A | * | 9/1961 | De Frangesco | ........ | B25D 17/24 |
| | | | | | | 279/19.5 |
| 4,334,688 | A | * | 6/1982 | Spargo | ................... | F16J 15/441 |
| | | | | | | 277/944 |
| 4,576,488 | A | * | 3/1986 | Steiner | .................. | F16C 33/102 |
| | | | | | | 384/291 |
| 4,724,912 | A | * | 2/1988 | Miyazaki | ................ | E02F 3/966 |
| | | | | | | 173/162.1 |
| 5,018,792 | A | * | 5/1991 | Roussin | ................. | B25D 17/24 |
| | | | | | | 173/162.1 |
| 5,645,357 | A | * | 7/1997 | Alain | ...................... | F16C 17/10 |
| | | | | | | 384/291 |
| 6,109,706 | A | * | 8/2000 | Oertley | .................. | B62D 55/21 |
| | | | | | | 305/59 |
| 6,510,904 | B1 | * | 1/2003 | Tyrrell | ................... | B25D 17/08 |
| | | | | | | 173/132 |
| 9,909,666 | B2 | * | 3/2018 | Moore | ..................... | F16J 10/04 |

(Continued)

FOREIGN PATENT DOCUMENTS

DE 20014712 U1 10/2000
EP 0900635 A2 3/1999

(Continued)

*Primary Examiner* — Thanh K Truong
*Assistant Examiner* — David G Shutty
(74) *Attorney, Agent, or Firm* — Corinne R. Gorski

(57) ABSTRACT

An insert bushing arrangement of a breaking hammer, a breaking hammer and a method of supporting a breaking tool of a breaking hammer is provided. The insert bushing arrangement includes a bearing support inside which an insert bushing is mountable. Between the bearing support and the insert bushing is one or more intermediate material layers for preventing jamming of the components.

13 Claims, 3 Drawing Sheets

(56) References Cited

U.S. PATENT DOCUMENTS

| | | | | |
|---|---|---|---|---|
| 2004/0124570 A1* | 7/2004 | Huh | ...................... | F16F 9/0263 |
| | | | | 267/64.12 |
| 2008/0173457 A1* | 7/2008 | Kahra | .................... | B25D 17/08 |
| | | | | 173/90 |
| 2015/0129269 A1* | 5/2015 | Muuttonen | ............ | B25D 17/06 |
| | | | | 173/206 |
| 2017/0072551 A1* | 3/2017 | Moore | .................. | F16C 29/126 |

FOREIGN PATENT DOCUMENTS

| | | |
|---|---|---|
| EP | 1930127 A1 | 6/2008 |
| WO | 2017048680 A1 | 3/2017 |

* cited by examiner

INSERT BUSHING ARRANGEMENT, BREAKING HAMMER AND RELATED METHOD

RELATED APPLICATION DATA

This application claims priority under 35 U.S.C. § 119 to EP Patent Application No. 18215498.9, filed on Dec. 21, 2018, which the entirety thereof is incorporated herein by reference.

TECHNICAL FIELD

The invention relates to a lower bearing arrangement of a breaking tool of a breaking hammer. The arrangement includes a removable insert bushing provided with slide bearing surfaces against or towards the tool. The invention further relates to a breaking hammer, and further to a breaking hammer and a method of supporting the breaking tool.

BACKGROUND

Breaking hammers are used to break hard materials, such as rock, concrete, and the like. The breaking hammer has a percussion device for generating impact pulses to a breaking tool connectable to the breaking hammer. The tool is supported to a frame of the breaking hammer by means of one or more tool bushings, which are sleeve-like objects through which the tool passes and reciprocates during its operation.

At a lower end of the breaking hammer there is a lower tool bushing or bushing arrangement, which is subjected to significant transverse loadings during the breaking. The lower tool bushing is also subjected to wear because of the reciprocating tool movement, and further, because impurities may pass between the tool and the bushing despite of protective tool seals. Thus, especially the lower tool bushing may deform and wear whereby it needs to be changed time to time. The lower end portion of the frame is typically designed so that the lower tool bushing arrangement includes an insert bushing, which is designed to provide easy removal and change.

However, despite to use of the insert bushing, the known solutions have drawbacks relating to dismounting and mounting of the tool bushings. The known solutions have shown to be time consuming and laborious, and sometimes the replacement work is impossible to execute in field circumstances and without extensive dismantling measures and tooling.

SUMMARY

An object of the invention is to provide a novel and improved insert bushing arrangement of a breaking hammer A further object is to provide a novel and improved a breaking hammer and a method of supporting a breaking tool, which all aim to facilitate maintenance of the breaking hammer.

An aspect of the disclosed solution is that an insert bushing arrangement of a breaking hammer includes an insert bushing, which is mountable axially inside a bearing support. An inner surface of the insert bushing serves as a slide bearing surface against a breaking tool. Axial movement of the insert bushing relative to the bearing support is limited by means of an insert locking element. Further, between opposing surfaces of the bearing support and the insert bushing is an intermediate material layer.

With the disclosed solution, maintenance of the lower tool supporting arrangement is facilitated when the disclosed insert bushing arrangement is used. Due to the intermediate material layer, jamming of the replaceable insert bushing is prevented and the maintenance measures can be executed quickly and without extensive tooling.

Further, providing the arrangement with the intermediate material layer is relatively easy and inexpensive. Also, there are several alternative ways for arranging the isolating intermediate material layer for the structure.

According to an embodiment, the bearing support and the insert bushing may be retrofitted to the existing breaking hammers. Outer dimensions of a frame bushing as well as first locking elements are then designed according to the existing tool bushings.

According to an embodiment, material of the mentioned intermediate material layer differs from materials of the bearing support and the insert bushing.

According to an embodiment, material of the intermediate material has been selected so that it has good material resistance against adhesive sticking with the material of the bearing support and the insert bushing. This way adhering between the materials may be avoided.

According to an embodiment, the bearing support is made of steel and the insert bushing is made of bronze, and wherein the material of the intermediate material layer has poor adhesion tendency with the steel and bronze. Alternatively, the insert bushing is also made of steel.

According to an embodiment, the intermediate material layer is made of aluminum or an aluminum alloy provided with a coating, such as an anodized surface coating. Anodizing is an electrolytic passivation process used to increase the thickness of the natural oxide layer on the surface of metal parts. The formed oxide layer isolates the aluminum material from direct metal to metal contact between the insert bushing and the bearing support. Thus, anodic film is applied to protect the aluminum alloys. Anodizing is also used to prevent galling of facing surface components and to improve lubrication.

According to an embodiment, the intermediate material layer is made of plastic material, such as polyamide. Further, elastomers, such as polyurethane and rubber-like materials, may also be used.

According to an embodiment, the intermediate material layer is made of composite material, which has at least one matrix material and at least one reinforcing material.

According to an embodiment, the intermediate material layer is made of rubber or rubber-like resilient material.

According to an embodiment, the basic structure or frame of the intermediate material layer may be made of suitable other metal materials and alloys provided with coating. Suitable coatings may be nitration or nitrogen hardening, for example.

According to an embodiment, the intermediate material layer may be sacrificed if need be, so as to break easily when the insert bushing is pulled out of the frame bushing. The intermediate material layer breaks relatively easily also when the intermediate material layer itself is being removed.

According to an embodiment, the intermediate material layer is configured to serve as a protective layer or element between the facing surfaces of the bearing support and the insert bushing. In other words, the intermediate material layer isolates the two components or items from each other, so that the components or items have no direct contact. This way jamming or sticking between a contact zone of the bearing support and the insert bushing is effectively prevented.

In other words, the aim of the intermediate material layer is to prevent adhesion between the surfaces of the bearing support and the insert bushing and to thereby avoid them sticking together. When a frame bushing is implemented as the bearing support, then the intermediate material layer isolates base materials of the frame bushing and the insert bushing from direct contact and prevents sticking of the facing bushing components.

According to an embodiment, the insert bushing includes a cylindrical intermediate element, which is a separate element mountable between the bearing support and the insert bushing. Thus, the cylindrical intermediate element serves as the intermediate material layer. Base material of the cylindrical intermediate element may be selected so that it has poor adhesion tendency with base material of the bearing support and will not therefore easily jam against surfaces of the bearing support.

According to an embodiment, between an inner diameter of the bearing support and an outer diameter of the insert bushing is a clearance. Accordingly, the intermediate element is mountable together with the insert bushing inside an axial opening of the bearing support.

According to an embodiment, the intermediate element is without fixed mounting. However, axial movement relative to the bearing support is limited in axial movement direction. The axial movement may be limited in a first direction by means of an axial support surface or shoulder, and in a second direction by means of a locking ring, for example.

According to an embodiment, the thickness of the intermediate material layer is at least 0.5 mm.

According to an embodiment, the thickness of the intermediate material layer is at least 1 mm.

According to an embodiment, the thickness of the intermediate material layer is at least 2 mm.

According to an embodiment, the cylindrical intermediate element includes an axial groove extending end to end and radially through the element. In other words, the cylindrical intermediate element has a longitudinal cutting or slit allowing size of the diameter of the element to be decreased when the element is assembled, and also when it is being removed.

According to an embodiment, when the cylindrical intermediate element is mounted inside the bearing support, between facing ends of the groove is a slit. The width of the slit may be at least 0.5 mm and is typically about 1 mm. It has been noted that when the size of the slit is as mentioned, assembly of the element is facilitated. The slit provides free space for the ends facing the slit to move towards each other.

According to an embodiment, the insert bushing includes at least two intermediate segment elements, which are separate elements mountable between the bearing support and the insert bushing. The two or more intermediate segment elements are together configured to form a cylinder-like element and to serve as the intermediate material layer.

According to an embodiment, the cylinder-like intermediate element consist of two halves.

According to an embodiment, the cylinder-like intermediate element includes three, four or even greater number of segment elements.

According to an embodiment, an alternative to the cylindrical intermediate element, or to the intermediate element having several segments, the intermediate element is a spiral-like intermediate element. The spiral-like element may include a helical through groove. Thus, the element may be lengthened during the mounting and the lengthening simultaneously decreases the outer diameter of the element facilitating thereby the mounting and when the lengthening force is removed, the element settles against inner surfaces of the bearing support.

According to an embodiment, the cylindrical intermediate element is a symmetrical piece, whereby mounting direction of the element is freely selectable. This embodiment facilitates mounting of the element, since it has no specific mounting direction. Further, it may be possible to turn the element if the structure is disassembled for some reason.

According to an embodiment, the cylindrical intermediate element includes several through holes allowing passage of lubricant radially through the element. The lubrication openings may be located at the middle of the element.

According to an embodiment, the mentioned intermediate element is provided with at least one material layer serving as an isolating material layer between the intermediate element and at least one of the following, the bearing support and the insert bushing. The material layer prevents sticking between opposing materials.

According to an embodiment, the isolating material layer may be made by means of anodization, nitration or nitrogen hardening.

According to an embodiment, the basic structure of the isolating element may have a rigid and heat-resistant metal frame provided with a thin coating or surface treatment.

According to an embodiment, at least one of the bearing support and the insert bushing is provided with at least one coated intermediate material layer.

According to an embodiment, on an inner surface of the bearing support is a fixed material layer thickness of which is at least 1 mm.

According to an embodiment, on an outer surface of the insert bushing is a fixed material layer thickness of which is at least 1 mm.

According to an embodiment, the intermediate material layer may be a relatively thin coating, such as 0.1 mm, or even in some cases 0.01-0.5 mm. For example, the anodization creates such thin anodized films or layers. The same applies also for nitration process.

According to an embodiment, the coated intermediate layer is formed by means of powder metallurgical methods.

According to an embodiment, the coated intermediate layer is formed by means of thermal spraying methods or metal spraying methods.

According to an embodiment, the bearing support includes a frame bushing, which is mountable removably to a body of the breaking hammer; a frame locking element for locking the frame bushing to a body of the breaking hammer; and wherein the insert bushing is mountable axially inside the frame bushing and wherein the inner cylindrical surface of the insert bushing serves as a slide bearing surface against a breaking tool, which is movable relative to the tool bushing; and wherein the insert bushing is removable without dismounting the frame bushing.

According to an embodiment, the bearing support is a frame bushing mountable to the frame of the breaking hammer. The insert bushing is mountable inside the frame bushing. The frame bushing and the insert bushing form together a tool bushing. The tool bushing can be removed in one piece from the frame of the breaking hammer, and further, the insert bushing can be removed from the frame bushing without removing the frame bushing.

According to an embodiment, the bearing support includes a bearing housing formed directly to the body of the breaking hammer and having support surfaces towards the insert bushing. In other words, this embodiment does not have any separate frame bushing, but instead the insert bushing is supported directly to the frame. The bearing housing may be provided with a coating material serving as the intermediate material layer. Alternatively, a separate intermediate element may be mounted between the fixed bearing housing and the insert bushing.

According to an embodiment, the solution relates to a breaking hammer, including a percussion device having a frame and an impact element arranged inside the frame; a breaking tool connectable to the percussion device and arranged to protrude from the frame; a bearing support, which is located at a tool side end of the frame; an insert bushing mounted removably inside the bearing support; and wherein inner surfaces of the insert bushing are configured to serve as slide bearing surfaces against the breaking tool. The insert bushing is as it is disclosed herein. Further, the bearing support may be a separate frame bushing mountable to a body of the breaking hammer, or alternatively the bearing bushing may be a bearing housing formed directly to the frame of the breaking hammer.

According to an embodiment, the solution relates to a method of supporting a breaking tool of a breaking hammer. The method includes providing a tool side lower end of the breaking hammer with at least one insert bushing; arranging the insert bushing inside a bearing support of the breaking hammer; and retaining the insert bushing by means of an insert locking element inside the bearing support. The method also includes providing the breaking hammer with an intermediate material layer between the bearing support and the insert bushing and thereby isolating the bearing support and the insert bushing from direct material contact at least at a slide bearing zone between them.

The method further includes selecting material properties between the intermediate material layer and the bearing support and further between the intermediate material layer and the insert bushing to have poor mutual adhesion tendency and to thereby preventing sticking of the materials. An advantage of the material selection is that the components can be removed relatively easily even at the work site and without a need to use extensive equipment.

According to an embodiment, axial movement of the insert bushing in axial direction is prevented by means of a locking ring.

According to an embodiment, the method further includes using a separate frame bushing as the mentioned bearing support. The embodiment further includes removing the insert bushing without removing the frame bushing. The removal may be executed at a work site of the breaking hammer.

Let it be mentioned that the disclosed insert bushing arrangement and the included intermediate material layer are also suitable for other types of breaking hammers than those disclosed herein. The percussion or impact device may differ from the one shown, for example. Around the frame of the breaking hammer may or may not be a protective casing surrounding the frame.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION

Figure 1:
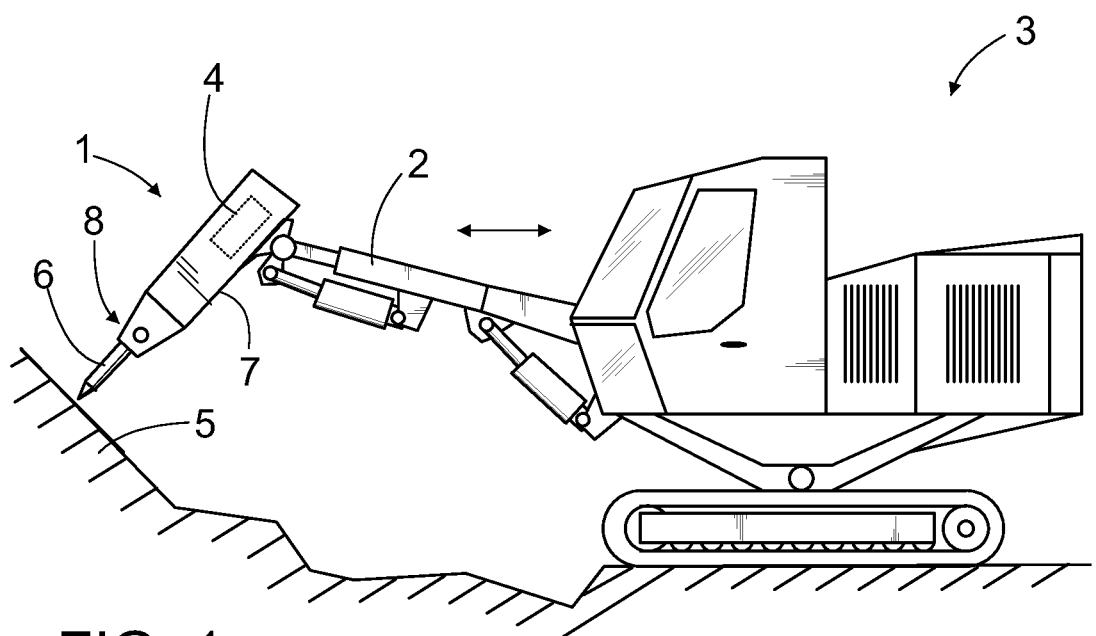
FIG. 1 is a schematic side view of an excavator, which is provided with a breaking hammer.

FIG. 1 shows a breaking hammer 1 arranged on a free end of a boom 2 in a working machine 3, such as an excavator. Alternatively, the boom 2 may be arranged on any movable carriage or on a fixed platform of a crushing apparatus. The breaking hammer 1 includes a percussion device 4 for generating impact pulses.

The breaking hammer 1 may be pressed by means of the boom 2 against material 5 to be broken and impacts may be simultaneously generated with the percussion device 4 to a tool 6 connected to the breaking hammer 1. The tool 6 transmits the impact pulses to the material 5 to be broken. The percussion device 4 may be hydraulic, whereby it may be connected to the hydraulic system of the working machine 2. Alternatively, the percussion device 4 may be electrically or pneumatically powered.

The impact pulses may be generated in the percussion device 4 by means of a percussion element, such as a percussion piston, which may be moved back and forth in the impact direction and return direction under the influence of hydraulic fluid. Further, the breaking hammer 1 may have a protective casing 7, inside which the percussion device 4 may be located. At a lower end of the breaking hammer, i.e., at the tool side end, is an insert bushing arrangement 8 for bearing the tool 6 to a frame of the breaking hammer. The insert bushing arrangement 8 includes a bearing support, such as frame bushing, an intermediate material layer and an insert bushing described further herein.

Figure 2:
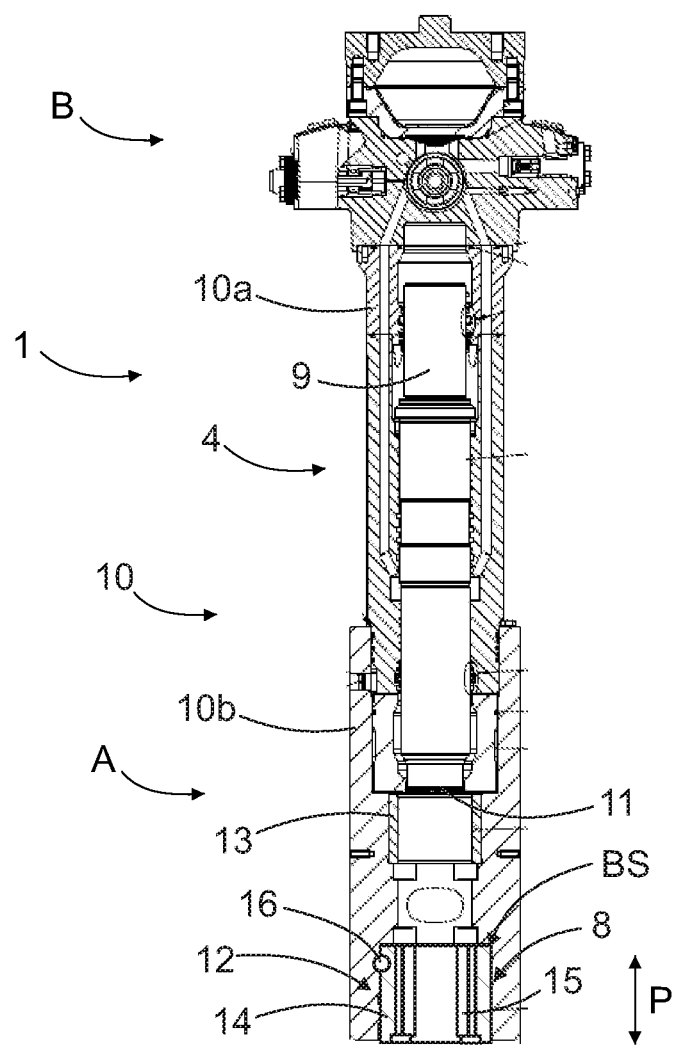
FIG. 2 is a schematic and cross-sectional side view of a percussion device of a breaking hammer.

FIG. 2 discloses a structure of a percussion device 4 of a breaking hammer 1. The breaking hammer has a lower end A at a tool side end and an upper end B. A percussion device 4 may include a percussion piston 9 arranged to move to and fro relative to a frame 10 of the percussion device 4. An impact surface 11 of the percussion piston 9 is arranged to strike an upper end of a tool, which is not shown in FIG. 2.

The tool is allowed to move in the axial direction P during the use. The frame 10 may have an upper frame part 10*a* and a lower frame part 10*b*.

At the lower end of the lower frame part 10*b* of the breaking hammer 1 is a bushing housing 12 configured to receive an insert bushing arrangement 8, which serves as a lower tool bushing. The tool is also supported by means of an upper tool bushing 13, which is mounted in place when the lower frame 10*b* is detached. The tool is configured to pass through the lower and upper tool bushings 8, 13, which both serve as bearing and support elements for the tool. However, the insert bushing arrangement 8 is subjected to greater mechanical forces and wear than the upper tool bushing 13, whereby the insert bushing arrangement 8 needs to be serviced and changed more often. Since the bushing housing 12 of the insert bushing arrangement 8 opens towards the lower end A of the breaking hammer 1, components of the insert bushing arrangement 8 can be dismounted without dismantling the basic structure of the frame 10.

The mentioned insert bushing arrangement 8 includes a frame bushing 14, which serves as a bearing support for an insert bushing 15 mounted inside the frame bushing 14. The frame bushing 14 may be locked to the lower frame part 10*b* by means of a transverse locking pin 16.

Figure 3:
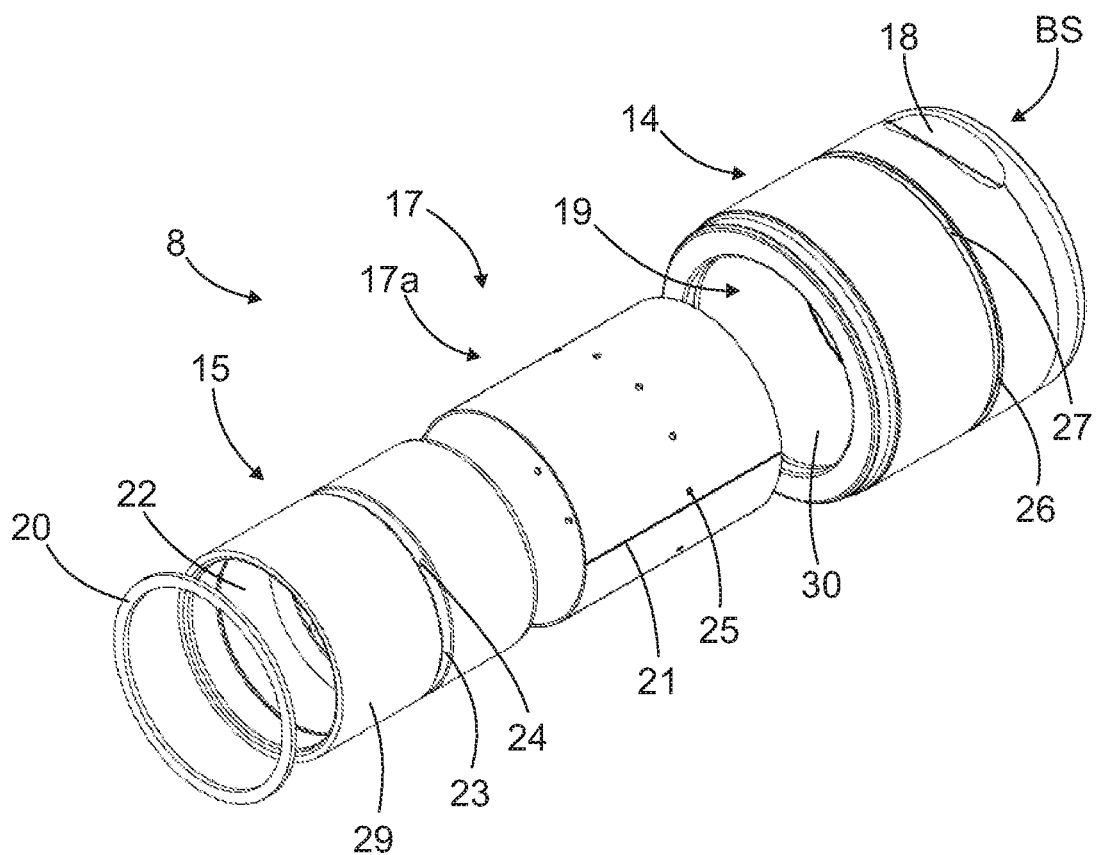
FIG. 3 is a schematic side view of an insert bushing arrangement including three components of a frame bushing, a cylindrical intermediate element and an insert bushing.
Figure 4:
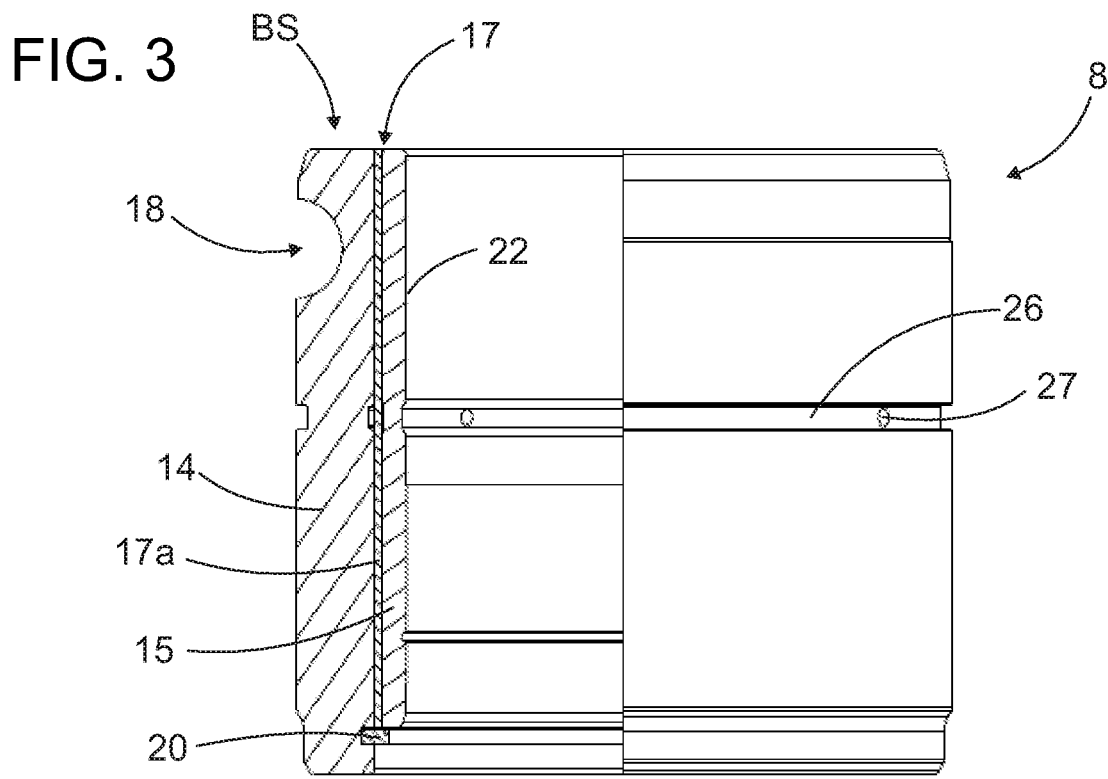
FIG. 4 is a schematic and partial cross-sectional side view of an insert bushing arrangement in a situation where the components are mounted one inside another.

FIG. 3 is an exploded view of an insert bushing arrangement 8 and FIG. 4 is an assembled view of the same. The insert bushing arrangement 8 comprises a frame bushing 14, an insert bushing 15 and an intermediate material layer 17. The frame bushing 14 may comprise at least one transverse groove 18 on its outer surface in order to be locked by means of a locking pin to a frame of a breaking hammer. The insert bushing 15 is mount-able axially inside an opening 19 of the frame bushing 14. The intermediate material layer 17 may be a cylindrical or sleeve-like intermediate element 17*a*, which is mountable axially between the frame bushing 14 and the insert bushing 15. The insert bushing 15 and the intermediate element 17*a* may be locked axially to the frame bushing 14 by means of an insert locking element 20, which may be a locking ring, for example. The intermediate element 17*a* may be cut in axial direction so that it has an axial groove 21 or slit, which facilitates mounting of the intermediate element 17*a*. The wall thickness of the intermediate element 17*a* is relative small compared to the wall thickness of the bushings 14 and 15. The lengths of the components 14, 15 and 17*a* corresponds substantially each other.

An inner surface 22 of the insert bushing 15 serves as a slide bearing surface facing a breaking tool. The insert bushing 15 is provided with a lubricating groove 23 and radial openings 24 for allowing lubricant to pass to the bearing surfaces. For the same reason, the intermediate element 17*a* includes matching openings 25, and the frame bushing 14 is provided with a lubrication groove 26 and radial openings 27.

The intermediate element 17*a* isolates an outer surface 29 of the insert bushing 15 and an inner surface 30 of the frame bushing 14 from direct contact and thereby prevents the bushings 14, 15 from jamming There exists minor movements between the surfaces 29 and 30 during the use of the breaking hammer and this may cause the jamming and may thereby make removal of the insert bushing 15 difficult in work site conditions. The jamming phenomena ruins the basic principle of the easily changeable insert bushing.

The pre-assembled structure shown in FIG. 4 may be mounted easily and fast in place and when a need exists the insert bushing 15 and the intermediate element 17*a* may be substituted without a need to remove the frame bushing 14. Due to the use of the intermediate material layer 17, the removal of the insert bushing 15 can be done using simple and light-weight hand tools.

Figure 5:
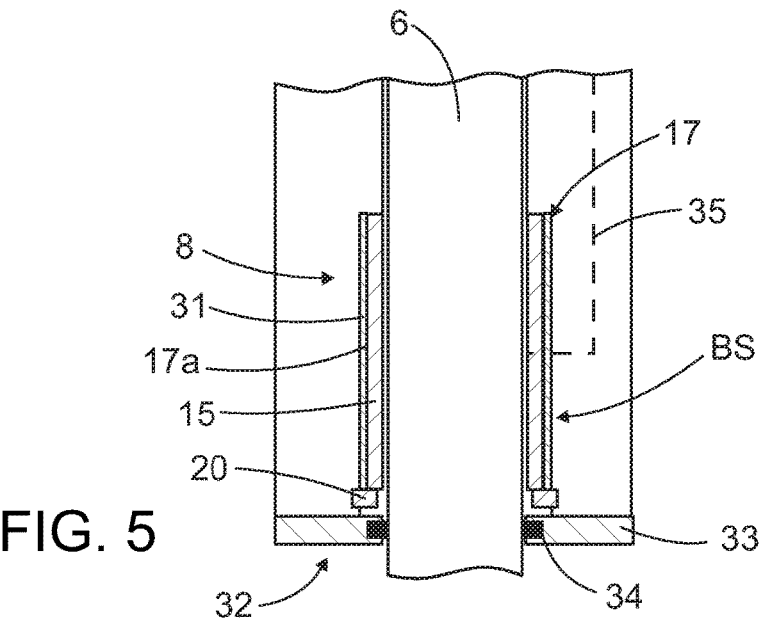
FIG. 5 is a schematic and partly cross-sectional view of an alternative insert bushing arrangement, wherein an insert bushing and a cylindrical intermediate element have been mounted inside a bearing housing formed to a lower end of the frame of the breaking hammer.

FIG. 5 discloses an alternative solution, which differs from the one shown in FIGS. 2-4 in that there is no frame bushing, but instead a bearing housing 31 serves as bearing support and receives the insert bushing 15 and the intermediate element 17*a*. The bearing housing 31 is formed directly to a frame 10 of the breaking hammer. In some cases, the intermediate material layer 17 may include a coating on surfaces of the bearing housing 31.

At a lower end of the frame 10 may be a sealing bushing or element 32, which includes a frame 33 and one or more tool seals 34. FIG. 5 further discloses a lubricating channel 35 for conveying lubricant between the insert bushing arrangement 8 and the breaking tool 6.

Figure 6:
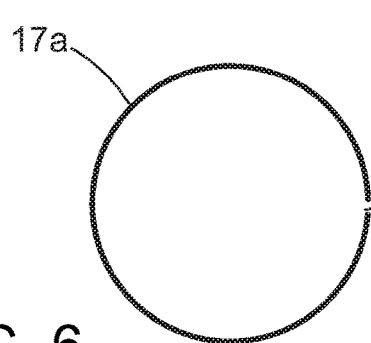
FIG. 6 is a schematic longitudinal view of a cylindrical intermediate element provided with a longitudinal slit.

FIG. 6 discloses a cylindrical intermediate element 17*a* provided with a longitudinal groove 21, slit or cutting.

Figure 7:
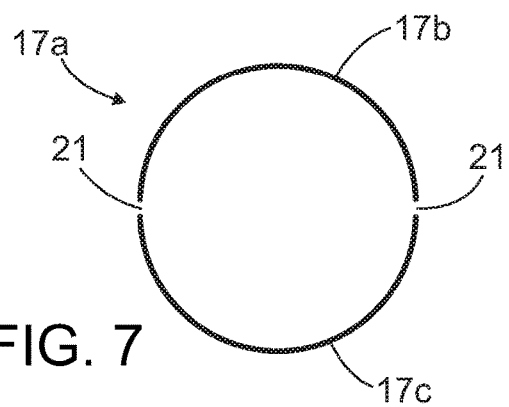
FIG. 7 is a schematic longitudinal view of a cylindrical intermediate element having two halves.

In FIG. 7 the intermediate element 17*a* has two halves 17*b* and 17*c*. The halves 17*b*, 17*c* are dimensioned so that when the halves are set to correspond diameter of the bearing support, there are two slits 21 between their ends.

Figure 8:
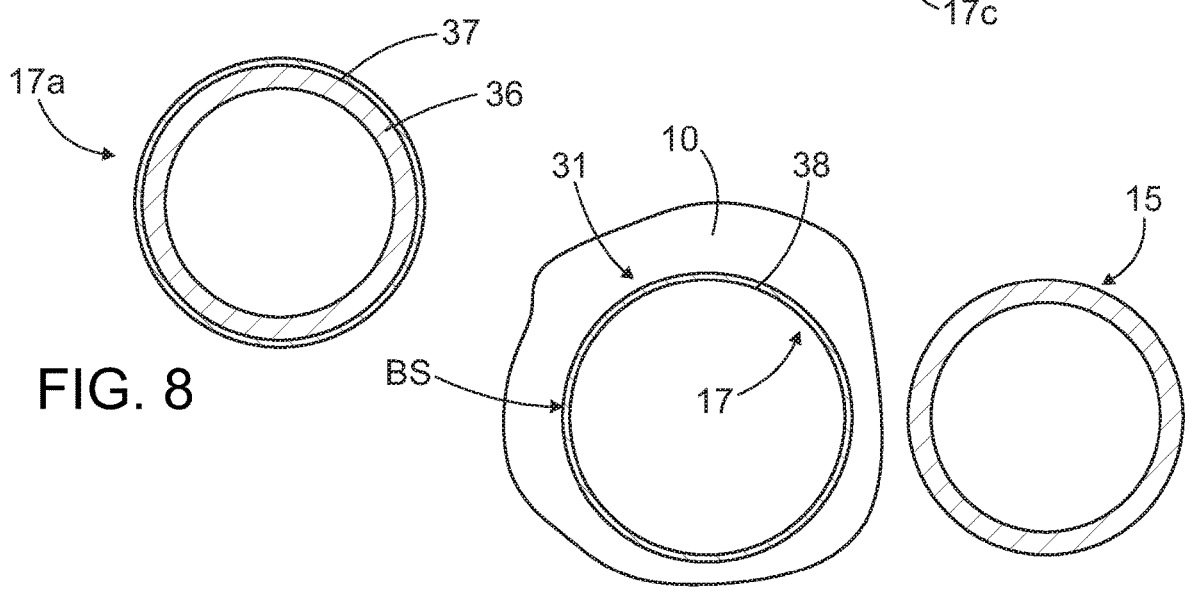
FIG. 8 is a schematic cross-sectional view of a cylindrical intermediate element comprising a ring-shaped frame made of base material and a coating on an outer surface of the frame.

FIG. 8 discloses an intermediate element 17*a* including a ring-shaped frame 36 made of base material, such as aluminum alloy, and a coating 37, such as an anodization layer, on an outer surface of the frame 36. In other words, the element 17*a* may have bi-material configuration.

Figure 9:
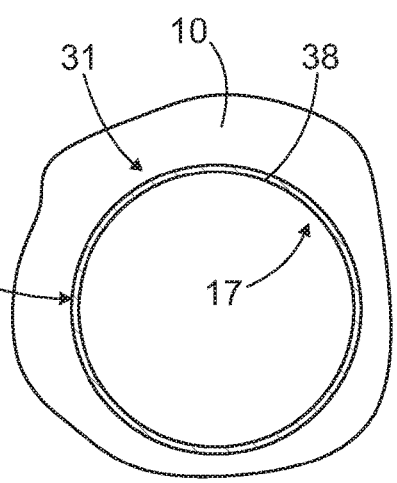
FIG. 9 is a schematic longitudinal view of a bearing housing provided with a coating and further showing an insert bushing mountable inside the bearing housing.

FIG. 9 discloses a bearing housing 31 provided with a coating 38. The coating 38 may serve as an intermediate material layer between an insert bushing 15 mountable inside the bearing housing 31.

The bearing support and its different embodiments are marked with reference markings BS in FIGS. 2-5 and 9.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. An insert bushing arrangement of a breaking hammer comprising:
    an insert bushing mountable axially inside a bearing support, wherein an inner cylindrical surface of the insert bushing is arranged as a slide bearing surface against a breaking tool, which is movable relative to the insert bushing, wherein the bearing support includes a frame bushing, which is mountable removably to a frame of the breaking hammer and a frame locking element arranged for locking the frame bushing to the frame of the breaking hammer, wherein the insert bushing is mountable axially inside the frame bushing, and wherein the inner cylindrical surface of the insert bushing serves as a slide bearing surface against the breaking tool, which is movable relative to the insert bushing arrangement, the insert bushing being removable without dismounting the frame bushing;
    an insert locking element configured to limit axial movement of the insert bushing relative to the bearing support; and
    an intermediate material layer disposed between opposing surfaces of the bearing support and the insert bushing.

2. The insert bushing arrangement as claimed in claim 1, wherein material of the intermediate material layer differs from materials of the bearing support and the insert bushing.

3. The insert bushing arrangement as claimed in claim 1, wherein the intermediate material layer is configured as a cylindrical intermediate element, which is a separate element mountable between the bearing support and the insert bushing.

4. The insert bushing arrangement as claimed in claim 3, wherein a thickness of the intermediate material layer is at least 0.5 mm.

5. The insert bushing arrangement as claimed in claim 3, wherein the cylindrical intermediate element includes an axial groove extending end to end and radially through the cylindrical intermediate element.

6. The insert bushing arrangement as claimed in claim 3, wherein the intermediate material layer is configured as at least two intermediate segment elements, which are separate elements mountable between the bearing support and the insert bushing and wherein the at least two intermediate segment elements are further configured to form a cylinder-like element.

7. The insert bushing arrangement as claimed in claim 3, wherein the cylindrical intermediate element is a symmetrical piece, whereby a mounting direction of the cylindrical intermediate element is freely selectable.

8. The insert bushing arrangement as claimed in claim 3, wherein the intermediate element is provided with at least one material layer serving as an isolating material layer between the intermediate element and the insert bushing.

9. The insert bushing arrangement as claimed in claim 1, wherein at least one of the bearing support and the insert bushing is provided with at least one coated intermediate material layer.

10. The insert bushing arrangement as claimed in claim 1, wherein the bearing support includes a bearing housing formed directly to the frame of the breaking hammer and including support surfaces towards the insert bushing.

11. A breaking hammer, comprising:
a percussion device including a frame and an impact element arranged inside the frame;
a breaking tool connectable to the percussion device and arranged to protrude from the frame;
a bearing support, which is located at a tool side end of the frame; and
an insert bushing arrangement in accordance with claim 1 having at least an insert bushing mounted removably inside the bearing support, wherein inner surfaces of the insert bushing are configured to serve as slide bearing surfaces against the breaking tool.

12. A method of supporting a breaking tool of a breaking hammer, the method comprising:
providing a tool side lower end of the breaking hammer with at least one insert bushing;
arranging the insert bushing inside a bearing support of the breaking hammer;
retaining the insert bushing by means of an insert locking element inside the bearing support
providing the breaking hammer with an intermediate material layer between the bearing support and the insert bushing and thereby isolating the bearing support and the insert bushing from direct material contact at least at a slide bearing zone therebetween;
selecting material properties between the intermediate material layer and the bearing support, and further, between the intermediate material layer and the insert bushing to have a poor mutual adhesion tendency and to thereby prevent sticking of materials;
using a frame bushing as the bearing support; and
removing the insert bushing without removing the frame bushing and executing the removal at a work site of the breaking hammer.

13. The method according to claim 12, further comprising preventing axial movement of the insert bushing in axial direction by means of a locking ring.

* * * * *